United States Patent Office

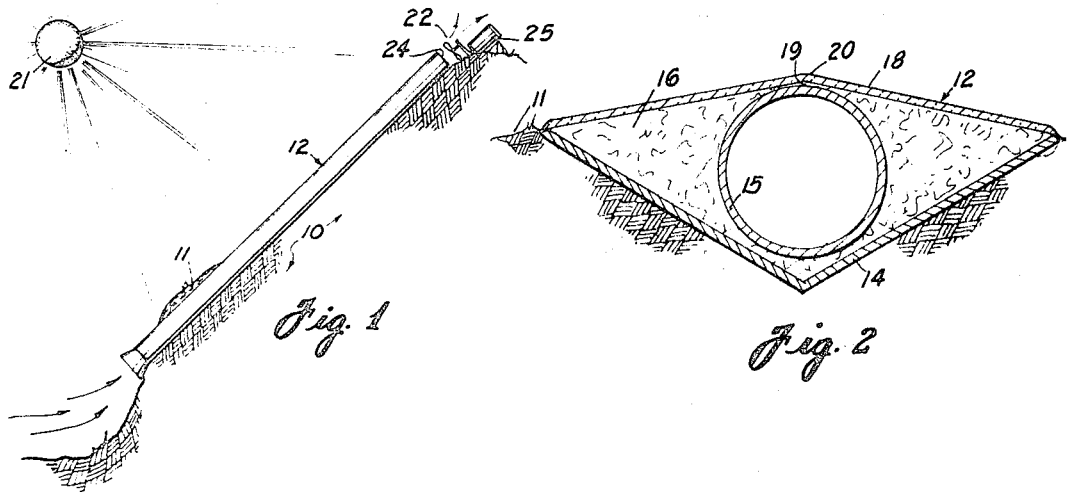
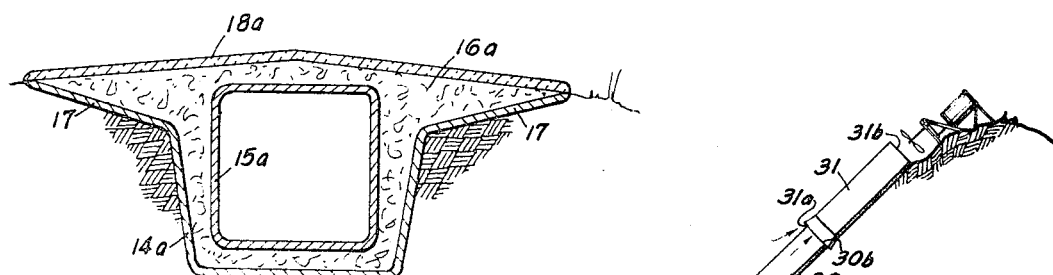
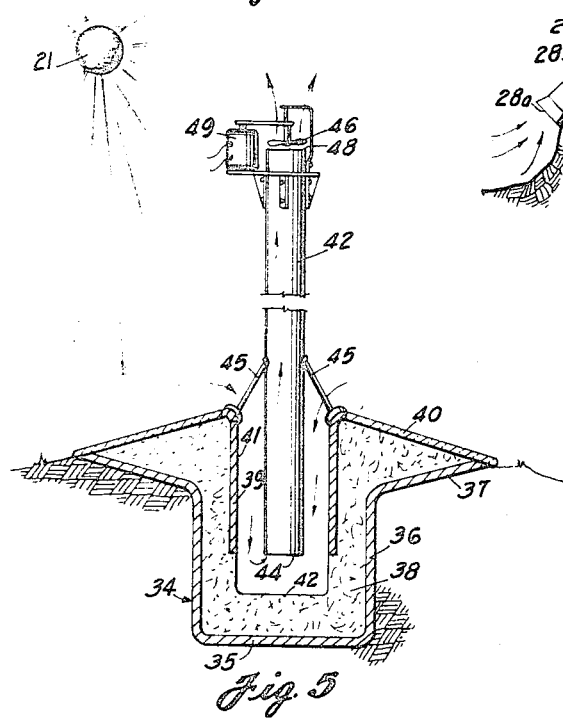

3,436,908
Patented Apr. 8, 1969

3,436,908
SOLAR AIR MOVING SYSTEM
Vukasin Van Delic, 188 Wynona Drive SW.,
Marietta, Ga. 30060
Filed Mar. 27, 1967, Ser. No. 626,269
Int. Cl. F03g 7/02, 7/04; F24j 3/02
U.S. Cl. 60—26                               12 Claims

ABSTRACT OF THE DISCLOSURE

Solar air moving apparatus comprising an upwardly extending, open ended hollow tube exposed to the rays of the sun, but protected from conduction and convection heat transmission to the ground and atmosphere. The tube is heated by radiation from the sun and the air inside the tube is heated and expands and becomes lighter, and is displaced by atmospheric air through the bottom opening of the tube, thus creating an air flow through the tube.

Background of the invention

In the construction of power generating plants, it is desirable to construct a plant that makes optimum use of natural phenomena and which requires a minimum of maintenance and repair. These features are generally found in dams where the energy of water flowing from a high level to a low level is tapped. Once the dam and its associated equipment is constructed, little maintenance and repair is required.

While hydroelectric dams have found wide application in the production of power, they are extremely expensive and must be located in the vicinity of large bodies of water, which limits their availability. While other power generating plants have been built, such as plants powered by coal or other forms of fuel, or by atomic energy, these plants are also expensive and, for the most part, substantially inefficient. Moreover, power generating plants of the type described above must be built on a large scale in order to produce power at a high efficiency.

Summary of the invention

This invention comprises a solar air moving system including an upwardly extending, open ended conduit exposed to the sun. The sun heats the conduit, and the conduit heats the air inside the conduit, causing the air to expand and become lighter, whereupon the more dense unheated atmospheric air tends to displace the lighter heated air through the lower open end of the conduit. The energy of the air flowing through the conduit is tapped to drive an electric generator.

Accordingly, it is an object of this invention to provide apparatus for inducing a flow of air, and extracting the energy from the flow of air to drive a power producing apparatus.

Another object of this invention is to provide apparatus for inducing a flow of air which is energized by the sun.

Another object of this invention is to provide apparatus energized by the sun for moving air from a first position to a second position.

Another object of this invention is to provide apparatus for generating power which is inexpensive to construct and maintain, and can be located at virtually any location exposed to the sun.

Other objects, features and advantages of the present invention will become apparent upon reading the following specification when taken in conjunction with the accompaying drawing.

Brief description of the drawing

FIG. 1 is a schematic view of the solar air moving system, showing the system supported on the side of a mountain.

FIG. 2 is a cross sectional view of the conduit system, and its related components, of the solar air moving system of FIG. 1.

FIG. 3 is a cross sectional view of the conduit of the solar air moving system, showing an alternate form of conduit system construction.

FIG. 4 is a schematic showing of an alternate form of the solar air moving system.

FIG. 5 is another alternate form of the invention showing a smaller version of the invention.

Description of the embodiments

Referring now more particularly to the drawing, in which like numerals indicate like parts throughout the several views, FIG. 1 shows a mountain 10 having a sloping side 11. A rectilinear conduit system 12 is supported by the sloping side 11.

As is shown in FIG. 2, conduit system 12 includes a base 14 which is supported by the sloping side 11 of the mountain, and which is generally V-shaped in cross sectional configuration. Base 14 is constructed of a material having low heat transfer qualities, such as asbestos. Conduit 15 is supported by base 14. Conduit 15 is constructed of a material which has high heat conductive qualities, such as steel. The interior surface of conduit 15 is substantially smooth so as to offer a minimum of resistance to air flowing therethrough.

Conduit 15 is covered with a heat conducting substance 16, such as metallic particles, sodium chloride, or any substance which readily conducts heat. Conduit 15 is adjusted so that the heat conducting substance 16 is positioned between conduit 15 and base 14, so that conduit 15 does not rest directly on base 14. Base 14 is substantially filled with the heat conducting substance 16, and the translucent cover 18 is positioned over base 14, covering conduit 15 and heat conducting substance 16. Translucent cover 18 may be fabricated of various different inexpensive, durable substances, including ground glass. When heat conducting substance 16 is placed over conduit 15, it is shaped to form a peak or ridge 19, and translucent cover 18 is shaped in a corresponding manner so that its peaked center portion 20 extends over ridge 19. Thus, the upper surface of translucent cover 18 slopes downwardly from its peaked center portion, for drainage purposes.

When translucent cover 18 is fabricated of ground glass, the glass is applied in loose form to the upper surface of heat conducting substance 16, and a clear bonding substance is applied to the ground glass; or alternatively, the bonding substance can be applied to the ground glass as the ground glass is applied to the heat conducting substance 16.

Conduit 15 is preferably colored black, on its exterior surface and its inside surface is polished, in its natural state, to reduce the surface-air friction. Heat conducting substance 16 is colored black so as to absorb the heat radiated from the sun.

FIG. 3 illustrates a modified form of the conduit system, showing a conduit 15a which is generally of rectangular cross sectional configuration. Base 14a generally correspond in shape to conduit 15a, to accommodate the flat side walls of the conduit. Base 14a includes generally upwardly directed side wall portions which taper outwardly from the side walls of conduit 15a, and wing portions 17 which extend laterally outwardly from conduit 15a, beneath translucent cover 18a. With this construction, translucent cover 18a provides a large surface area for the absorption of the sun rays, conduit 15a is large in cross section to define a large area for the passage of air therethrough, and a minimum of heat conducting substance 16a is required between base 14a, conduit 15a and translucent cover 18a.

When conduit system 12 is constructed as shown in FIG. 2, the rays emitted from the sun 21 pass through translucent cover 18 and shine on the heat conducting substance 16 beneath the cover 18. Translucent cover 18 prevents heat transfer from heat conducting substance 16 to the atmosphere due to conduction or convection while permitting heat to be passed therethrough from the sun's radiation. When heat conducting substance 16 is heated, it transfers heat toward conduit 15. When conduit 15 is heated, it warms the air therein, which expands and becomes lighter. Since conduit system 12 extends in an upward direction, and since the column of air within conduit 15 becomes lighter, the heavier air outside conduit 15 tends to replace the air inside conduit 15, thus creating a flow of air in an upward direction through conduit 15. As the new, cooler air enters the lower opening or inlet of conduit 15, the heat imparted to conduit 15 from the sun 21 tends to heat the new air, thereby expanding the new air to also make it lighter. Thus, the new air will be replaced by the outside, heavier air. Of course, this makes the flow of air through conduit 15 continuous, as long as sun 21 radiates heat through translucent cover 18.

A rotor 22 is rotatably mounted at the exit end 24 of conduit system 12. Rotor 22 is connected to an electric power generator 25. Thus, the passage of air through conduit system 12 impinges upon rotor 22, causing rotation thereof, which energizes the electric power generator 25.

When the sun 21 is not available to radiate heat to conduit 15, as at night time, a residual quantity of heat will have been built up in the heat conducting substance 16 so that air flow through conduit 15 will be induced for a substantial period of time. Of course, the length of time which flow of air through conduit 15 will be induced after the sun goes down will depend upon the amount of heat conducting substance 16 surrounding conduit 15, the intensity of the sun before it went down, and various other atmospheric conditions. It is anticipated that, in most installations, the amount of heat conducting substance 16 surrounding conduit 15 will be sufficient to retain enough heat to induce air flow through conduit 15 throughout the entire night.

As is shown in FIG. 4, the conduit system may be constructed in sections, such as sections 28, 29, 30 and 31, each defining inlet openings, 28a, 29a, 30a and 31a, and outlet openings 28b, 29b, 30b and 31b. The cross sectional areas of the conduits 28-31 increase from top to bottom of the conduit system, so that each conduit is slightly larger in internal cross sectional area than the conduit preceding it. With this construction, the flow of air induced in conduit 28 will be directed toward the inlet 29a of conduit 29. Inasmuch as the internal cross sectional area of conduit 29 is larger than that of conduit 28, an additional quantity of air will be induced to flow through inlet opening 29a of conduit 29. Thus, the quantity of air flowing through conduit 29 will be larger than that flowing through conduit 28, and the quantity of air flowing through each succeeding conduit will be larger than that flowing through each preceding conduit. Thus, conduit 28 will be sized and shaped to induce a flow of air therethrough up to a predetermined velocity which approaches a turbulent flow condition. When the air from conduit 28 enters conduit 29, an extra quantity of unheated air will be added thereto through opening 29a. The heat absorbed by conduit 29 will be effective to expand the new air and maintain the air received from conduit 28 in a heated condition. The same function is achieved by each succeeding conduit, so that a very large quantity of air will be exhausted by conduit 31 as compared with that exhausted by conduit 28. In this manner, optimum use of the heat receiving capabilities of each conduit is attained, the flow of air induced through each conduit is maintained at a velocity slightly below the point of critical turbulent velocity, and a large quantity of air is moved through the conduit system. Thus, the power generator located adjacent the outlet of the conduit system will be motivated by a large quantity of fast-moving air.

As is shown in FIG. 5, the principle disclosed in FIGS. 1-4 can be practiced without the supporting features of the side of a mountain. The solar air moving systems of FIGS. 1-4 are provided for moving a large quantity of air and powering a large capacity electric power generator. The system disclosed in FIG. 5 is anticipated as being constructed on a smaller scale for lower power requirements. A base 34 fabricated from a substance having low heat conductive qualities, such as asbestos, is positioned in a natural or man-made recess in the ground. The base is generally cylindrical in shape and includes a bottom wall 35, upwardly extending annular side wall 36, and an outwardly extending annular flange surface 37. Heat conducting substance 38 is positioned over the bottom wall surface, around the inner surface of side wall 36, and over the annular flange surface 37. An annular sleeve 39 of low heat conducting properties is positioned within base 34, around the interior surface of heat conducting substance 38. An annular translucent cover 40 is positioned over the heat conducting substance 38 and slopes from the upper end of annular sleeve 39, in a downward direction over the outer perimeter of annular flange surface 37. Thus, a downwardly extending opening 41 is created with the annular sleeve 39 extending only part-way to the bottom 42 of the opening with the heat conducting substance 38 at the bottom of base 34 forming the remaining surface of opening 41.

An upwardly extending conduit 42 is placed in opening 41. The lower end 44 of conduit 42 is positioned at approximately the same level as the lower end of annular sleeve 39, and support members 45 maintain conduit 42 in an upright position, generally concentric with opening 41. Conduit 42 is fabricated from a substance having high heat transfer qualities, and is colored black on its outside surface and is polished on its inside surface. A propeller 46 or similar air motivated rotor apparatus is connected to the upper end 48 of conduit 42 and an electric power generator 49 is connected to propeller 46.

With this construction, the heat radiated from sun 21 will penetrate translucent cover 40 to heat the heat conducting substance 38. The insulated base 34 and annular sleeve 39 prevent any significant heat loss from substance 38, so that the heat imparted to substance 38 is generally conducted through the substance until it is adjacent the bottom surface 42 of opening 41 where it is effective to heat the air within opening 41. Also, heat radiated from sun 21 is absorbed by the outer surface of conduit 42. The heated conduit 42 heats and expands the air within conduit 42 so that a flow of air is induced, in an upward direction through conduit 42. The air flowing in an upward direction through conduit 42 must first enter opening 41, between the exterior surface of conduit 42 and annular sleeve 39. As the air travels in a downward direction through opening 41, virtually no heat is imparted thereto by annular sleeve 39. When the air gets in the vicinity of the bottom surface 42 of opening 41, a portion of the heat present in heat conducting substance 38 is transferred to the air. Thus, the air is heated to a substantial extent prior to entering conduit 42, and as the air travels through the upper portion of conduit 42, it is heated to a further extent and becomes lighter.

With the construction shown in FIG. 5, a minimum length or height of tube 42 is required to produce a large air flow. Thus, a compact construction is provided for generating air flow, which may be utilized at virtually any point exposed to sunlight. While it is not shown in the drawing, the base structure of FIG. 5 can be combined with the structures of FIGS. 1-4 to enlarge the capacity of the inclined conduits.

In constructing the conduit system of FIG. 1, it is anticipated that the width of translucent cover 18 and the heat conducting substance 16 therebelow will be approximately three times the diameter of conduit 15 and sufficient heat conducting substance 16 will surround conduit 15 to provide an adequate flow path for the conduction of heat to the conduit. The conduit system should be placed on the southern side of a mountain, or the like, so that it will be exposed to sunlight throughout the daylight hours. The sloping surfaces of translucent cover 18 are shaped so that the sun will strike the heat conducting substance 16 during the early morning and twilight hours, as well as throughout the midday hours.

In order to move a large quantity of air, the diameter of conduit 15 should be as large as possible. It is anticipated that the diameter of conduit 15 will be as much as 40 feet and the width of translucent cover 18, 120 feet. The conduit system should be disposed at an angle of at least 45° to minimize the resistance between the inside surface of the conduit and the air flowing therethrough. If the conduit system extended a height of 4900 feet at an angle of 45°, the length of the system would be approximately 7000 feet. The 7000 foot length and the 120 foot width of heat conducting substance 16 exposed to the sun's radiation provides 840,000 square feet of heat absorbing area. An area of this magnitude could absorb a very large amount of heat during the daylight hours, and the construction of the base 14 is such that only a small portion of the heat would be lost to the ground, due to conduction heat transfer. Thus, an extremely high percentage of the heat absorbed by the heat conducting substance 16 will be transmitted to the conduit 15 and the air therein.

To calculate the quantity of air that flows through the conduit system, the following formula is provided:

$$Q = 9.4 A [h(T_i - T_o)]^{\frac{1}{2}}$$

where Q is the quantity of the air that flows through the conduit system, A is the cross sectional area of the conduit, $h$ is the height from the entrance to the outlet of the conduit, $T_i$ is the temperature of the air inside the conduit and $T_o$ is the temperature of the air outside the conduit. Of course, the temperature of the air inside the conduit will vary from the inlet to the outlet so that an average must be determined. Also, the temperature of the outside air will vary from the bottom to the top openings of the conduit, so that an average outside temperature must be determined.

While the invention has been disclosed as being utilized to drive an electric power generator, it should be understood that various other uses of the invention might be made. For instance, it is anticipated that the function of moving a vast quantity of air would be beneficial to smog-laden areas. At least a portion of the air over a city adjacent a mountain could be channeled through such a conduit system positioned on an adjacent mountain, thereby evacuating the polluted air from the city. Furthermore, the enormous height of the conduit system is such that if a temperature inversion condition were experienced in a city to prevent the movement of air in the city, the upper portion of the conduit system would likely protrude through the upper portion of the temperature inversion and function to exhaust the polluted air above the inversion. When applied in this manner, and possibly in other applications, a particle collector, such as a filter, can be positioned about the exit end of the conduit to collect the particles entrained in the air to obtain samples of the particles polluting the air. In this manner, the source of air pollution can be determined.

While the invention disclosed depends upon the presence of the sun for its source of energy, it should be noted that, under normal circumstances, power requirements of a city are usually at a maximum during the daylight hours and early evening hours, which are the hours of maximum performance of the conduit system. During the early morning hours, the sun will be effective to warm the heat conducting substance, and by the time the normal power requirements of a city are increased later during the morning, the sun will have heated the conducting substance 16 and conduit 15 so that conduit 15 is effective to induce a substantial air flow through the conduit system. During the early evening hours, the residual heat present in the heat conducting substance 16 and conduit 15 will function to continue to induce a flow of air through the conduit. While the flow of air through conduit 15 may be reduced during the late night hours the power requirements of a city are also normally reduced during this period of time.

What is claimed as my invention is:

1. Apparatus for moving air comprising an upwardly extending open ended conduit, heat conducting means in contact with said conduit for absorbing radiant heat, insulating means for resisting conduction heat transfer from said heat conducting means, and a translucent cover extending over said heat conducting means, said cover being fabricated of ground glass.

2. The invention of claim 1 wherein said conduit is surrounded by said heat conducting means and said heat conducting means is supported by said insulating means.

3. The invention of claim 1 wherein said cover slopes in a downward direction on each side of said conduit.

4. The invention of claim 1 wherein the inner surface of said conduit is smooth.

5. The invention of claim 1 wherein said conduit is disposed at an angle between 45 degrees and 90 degrees with the horizontal.

6. The invention of claim 1 and further including power generating means positioned at the upper end of said conduit and constructed to be motivated by air flowing through said conduit.

7. Apparatus for moving air comprising an upright generally cylindrical base including a closed lower end and an annular flange extending outwardly from its upper end, heat conducting substance positioned over the internal surface and upper surface of said base, a sleeve generally concentrically positioned within said base, an annualr cover extending outwardly from said sleeve to the perimeter of said annular flange, and an open ended conduit of smaller diameter than said sleeve positioned within said sleeve and extending upwardly therefrom.

8. The invention of claim 7 wherein said base and said sleeve are fabricated from a material having low heat transfer qualities, and said annular cover is translucent.

9. The invention of claim 8 and further including electric power generating means positioned at the upper end of said conduit constructed to be energized by air flowing through said conduit.

10. Apparatus for moving air comprising an elongated substantially rectilinear base of concave cross section extending in an upward direction and having an outwardly extending flange portion on each side, said base being fabricated of heat insulating material, an elongated substantially rectilinear open ended conduit positioned in and extending along said base, a mass of heat conducting material positioned in said base and generally surrounding said conduit, and a translucent cover extending over and along said base, conduit and heat conducting material, said cover being connected to the edge of each flange portion.

11. The invention of claim 10 wherein said cover comprises a fold along its length and slopes in a downward direction on opposite sides of the centerline of said conduit.

12. Apparatus for moving air comprising a series of aligned conduits extending in an upward direction, each of said conduits being open ended and placed in closely spaced end-to-end relationship with one another, each conduit of said series of conduits being of larger internal cross sectional area than the external cross sectional area of the conduit next below, and means for heating said conduits, said means for heating said conduits comprises a base for each conduit fabricated of heat insulating material, heat conducting material surrounding each of said conduits, and a translucent cover extending over the upper portion of the heat conducting material of each conduit, whereby heat radiated from the sun passes through said covers to said heat conducting material and to said conduits.

References Cited

UNITED STATES PATENTS

| | | | |
|---|---|---|---|
| 1,814,897 | 7/1931 | Coxe | 126—270 |
| 2,277,311 | 3/1942 | Freeman | 126—271 |
| 2,595,905 | 5/1952 | Telkes | 126—270 |
| 2,998,005 | 8/1961 | Johnston | 126—270 |

FOREIGN PATENTS

| | | |
|---|---|---|
| 369,199 | 11/1906 | France. |
| 938,012 | 9/1963 | Great Britain. |
| 164,912 | 4/1954 | Australia. |
| 8,711 | 1896 | Great Britain. |
| 481,341 | 3/1938 | Great Britain. |

CARROLL B. DORITY, JR., *Primary Examiner.*

U.S. Cl. X.R.

126—270; 165—45